(12) United States Patent
Bernat et al.

(10) Patent No.: US 11,387,646 B2
(45) Date of Patent: Jul. 12, 2022

(54) POWER MANAGEMENT SYSTEM FOR MAINTAINING BUS VOLTAGE

(71) Applicant: HEWLETT PACKARD ENTERPRISE DEVELOPMENT LP, Houston, TX (US)

(72) Inventors: Mohamed Amin Bernat, Houston, TX (US); Kailash Kishore Mirpuri, Houston, TX (US); Daniel Humphrey, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/919,371

(22) Filed: Jul. 2, 2020

(65) Prior Publication Data
US 2022/0006287 A1    Jan. 6, 2022

(51) Int. Cl.
| | | |
|---|---|---|
| H02H 3/22 | (2006.01) | |
| H02H 9/02 | (2006.01) | |
| H02H 1/00 | (2006.01) | |
| H02H 9/00 | (2006.01) | |
| H02H 3/02 | (2006.01) | |
| H02H 9/08 | (2006.01) | |

(Continued)

(52) U.S. Cl.
CPC ............ *H02H 9/02* (2013.01); *H02H 1/0007* (2013.01); *H02H 3/22* (2013.01); *H02H 9/005* (2013.01); *H02H 3/021* (2013.01); *H02H 3/20* (2013.01); *H02H 9/04* (2013.01); *H02H 9/08* (2013.01)

(58) Field of Classification Search
CPC ............ H02H 3/22; H02H 3/20; H02H 3/021; H02H 9/04; H02H 9/02; H02H 9/005; H02H 1/0007; H02H 9/021; H02H 9/023; H02H 9/08

USPC ................................. 361/8, 13, 91.1, 91.7
See application file for complete search history.

(56) References Cited

U.S. PATENT DOCUMENTS

RE37,738 E     6/2002  Brkovic
6,632,031 B1  10/2003  Zhang et al.
(Continued)

FOREIGN PATENT DOCUMENTS

CN         108649549 A     10/2018

OTHER PUBLICATIONS

Abdel-Rahman, O. et al., "Transient Response Improvement in Dc-dc Converters Using Output Capacitor Current for Faster Transient Detection," 2007 IEEE Power Electronics Specialists Conference, Jun. 17-21, 2007, https://ieeexplore.ieee.org/document/4341981.

*Primary Examiner* — Danny Nguyen
(74) *Attorney, Agent, or Firm* — Hewlett Packard Enterprise Patent Department (57) ABSTRACT

Examples described herein relate to a power management system. The power management system may include an input power filter coupled between a common power bus having a first voltage level and a load. The input power filter may include a variable impedance circuit coupled to an input capacitor. Further, the power management system may include a bus voltage controller coupled to the input power filter to detect a transient event causing a surge in a load current drawn by the load and to alter an impedance of the variable impedance circuit to limit an input current flowing via the variable impedance circuit, thereby maintaining voltage on the common power bus within a predefined range from the first voltage level.

19 Claims, 8 Drawing Sheets

(51) Int. Cl.
　　　*H02H 3/20* 　　　(2006.01)
　　　*H02H 9/04* 　　　(2006.01)

(56) 　　　　References Cited

U.S. PATENT DOCUMENTS

| | | | |
|---|---|---|---|
| 7,852,053 B2 | 12/2010 | Martin et al. | |
| 8,830,647 B2 * | 9/2014 | Chen | H02H 9/02 |
| | | | 361/93.9 |
| 9,178,420 B1 * | 11/2015 | Hawley | H02M 3/157 |
| 2008/0247105 A1 * | 10/2008 | Divan | H02H 9/04 |
| | | | 361/56 |
| 2013/0314828 A1 | 11/2013 | Chen et al. | |

* cited by examiner

POWER MANAGEMENT SYSTEM FOR MAINTAINING BUS VOLTAGE

BACKGROUND

In computing systems, for example, servers, desktop computers, edge computing devices, and/or portable computing devices, processing resources (e.g., processors) are implemented to fulfill various computing demands. Computing demand from these computing systems may vary time-to-time and may be unpredictable in certain instances. The variations in the computing demand may cause changes in a processing load on the processing resources disposed in the computing systems.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements may be coupled mechanically, electrically, magnetically, or communicatively linked through a communication channel, pathway, network, or system. Further, the term "and/or" as used herein refers to and encompasses any and all possible combinations of the associated listed items. It will also be understood that, although the terms first, second, third, fourth, fifth, sixth, seventh, eighth, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

In computing systems, for example, servers, desktop computers, edge computing devices, and/or portable computing devices, processing resources (e.g., processors) are implemented to fulfill various computing demands. Computing demand from these computing systems may vary time-to-time and may be unpredictable in certain instances. The variations in the computing demand may cause changes in a processing load on the processing resources disposed in the computing systems. For example, a sudden increase in the computing demand may cause an increase, e.g., a surge, in the processing load of the processing resources to fulfill the increased computing demand. Consequently, the processing resources may draw more current to operate at high-performance levels to handle the increased processing load.

Typically, a computing system may include a power supply to convert utility power to a regulated power (e.g., at 12V DC) on a common power bus. Such regulated power from the common power bus may be usable by various loads (e.g., the processing resources, storage devices, auxiliary sub-systems, and the like) connected to the common power bus to enable their functioning in the computing system. Certain types of loads such as the processing resources may operate at even lower voltage levels than the voltage level on the common power bus. Accordingly, such loads may receive usable power via a voltage regulator connected to the common power bus. The voltage regulator may provide power to the processing resources at a voltage level that is lower than the voltage level on the common power bus and is usable by the processing resources.

As noted earlier, the processing resources may draw more current to operate at high-performance levels to handle the increased processing load. In certain instances, the processing resources may draw large currents in a very short duration causing high amplitude current transients with high slew rate. In such an event of the surge in the current demand by the processing resources, the voltage regulator may in-turn draw increased current from the common power bus. Such increase in the current drawn from the common power bus may cause a drop in a voltage level on the common power bus. The drop in the voltage level on the common power bus may in-turn cause voltage regulation issues on various other loads connected to the common power bus. While some loads are not much sensitive about the voltage drop on the common power bus, certain types of loads (e.g., hard drive) are sensitive to the voltage drop on the common power bus and their performance may be impacted or they stop functioning. As will be understood, the issues pertaining to the performance and/or functioning of such loads may affect overall functioning, performance, and/or reliability of the computing system.

Some conventional systems may address such voltage drop issue on the common power bus by adding a capacitor at an input of the voltage regulator. Such capacitor may aid in speeding up a response of the voltage regulator by allowing an energy stored in the capacitor to supply additional current demand. The capacitor may also slow-down a drop in the voltage level of the common power bus voltage while the voltage regulator increases its output and the system power supply responds to maintain the voltage level of the common power bus. Further, some systems may also use much higher capacity power supplies than required for a power requirement of the load and increasing input power filter components to provide increased isolation from the common power bus. Unfortunately, these existing solutions have limited effect for maintaining a steady voltage level on the common power bus at certain voltage levels (e.g., a commonly implemented 12V level on the common power bus). Moreover, the existing solutions may require significant increase in cost and size of the components such as the capacitor and other components used in an input power filter connected to the voltage regulator.

In accordance with aspects of the present application, a power management system is presented. The power management system may include an input power filter coupled between a common power bus and a load, wherein the common power bus comprises a voltage at a first voltage level. The input power filter may include a variable impedance circuit coupled to an input capacitor. Further, the power management system may include a bus voltage controller coupled to the input power filter to detect a transient event causing a surge in a load current drawn by the load and to alter an impedance of the variable impedance circuit to limit an input current flowing via the variable impedance circuit, thereby maintaining voltage on the common power bus within a predefined range from the first voltage level.

As will be appreciated, the bus voltage controller controls the variable impedance circuit to increase the impedance of the variable impedance circuit to limit flow of the current to the load. Advantageously, the voltage on the common power bus may be within the predefined range from the first voltage level. Since the voltage on the common power bus may be within the predefined range from the first voltage level, impact of voltage regulation issues on the other loads connected to the common power bus may be greatly reduced. In some examples, the variable impedance circuit may include an inductor, an electronic switch coupled in series with the inductor, and an impedance element coupled in parallel with a series combination of the inductor and the electronic switch. The impedance element may include a resistor, an inductor, a capacitor, or combinations thereof.

Figure 1:
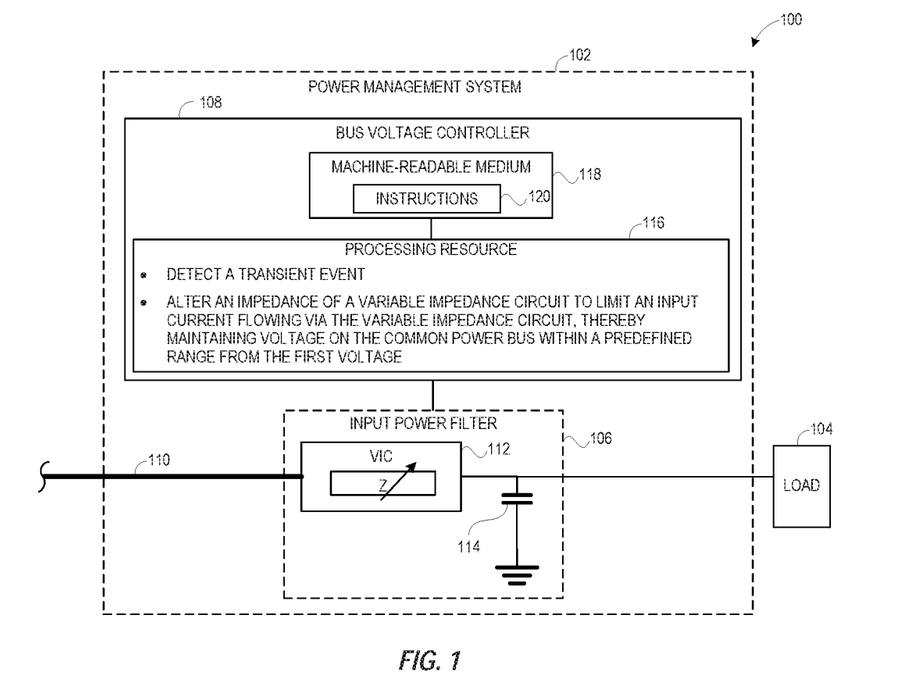
FIG. 1 depicts a system including a power management system, in accordance with an example.

Referring now to the drawings, in FIG. 1, a system 100 including a power management system 102 is depicted, in accordance with an example. The system 100 may be a computing system or any other electronic system that may be capable of storing data, processing data, and/or communicating data with external devices. Non-limiting examples of the system 100 may include, but are not limited to, a server, a storage device, a network switch, a router, a mobile communication device, a desktop computer, a portable computer, a networked resource enclosure, an edge-computing device, or a WLAN access point. The server may be a blade server, for example. The storage device may be a storage blade, for example.

The system 100 may include the power management system 102 coupled to a load 104. As will be appreciated, the system 100 may also include several other electronic components that are not shown in FIG. 1. The power management system 102 may provide electric power to the load 104 to enable functioning of the load 104. The load 104 may be any electronic component that consumes the electric power. Examples of the load 104 may include storage devices, auxiliary sub-systems, and compute resources such as one or more processors, and the like. In the description hereinafter, the load 104 is described as being a processing resource for illustration purposes. By way of example, the processing resource (i.e., an example load 104) may be a physical device, for example, one or more central processing unit (CPU), one or more semiconductor-based microprocessors, one or more graphics processing unit (GPU), application-specific integrated circuit (ASIC), a field programmable gate array (FPGA), other hardware devices capable of computing, data processing, and/or graphics processing requirements in the system 100.

In some examples, the power management system 102 may supply the electrical power to the load 104. The power management system 102 may receive the electrical power from a common power bus 110 that is coupled to a power supply (not shown). The power supply may receive utility power and convert the utility power to a DC power that may be available on the common power bus 110. Further, in the system 100, the load 104 and several other loads (not shown, e.g., storage devices, cooling system fan, etc.) may be coupled to the common power bus 110 and receive electrical power for their respective operations. Accordingly, the common power bus 110 may also at times referred to as shared power bus. A voltage of the electrical power on the common power bus 110 is hereinafter referred to as bus voltage. Typically, the power supply may convert the utility power to the DC power such that the bus voltage is maintained at a predefined voltage level (e.g., 12V DC), hereinafter referred to as a first voltage level. In some examples, the first voltage level may also have another value, such as, 3 V, 5 V, 6 V, 9 V, 24 V, or any other voltage suitable for operation of the loads connected to the common power bus 110. In some examples, a power management system may also include a voltage regulator (see FIGS. 2 and 3) to further process the electrical power received from the common power bus 110 to regulate the same to make it suitable for use by the load 104.

Figure 2:
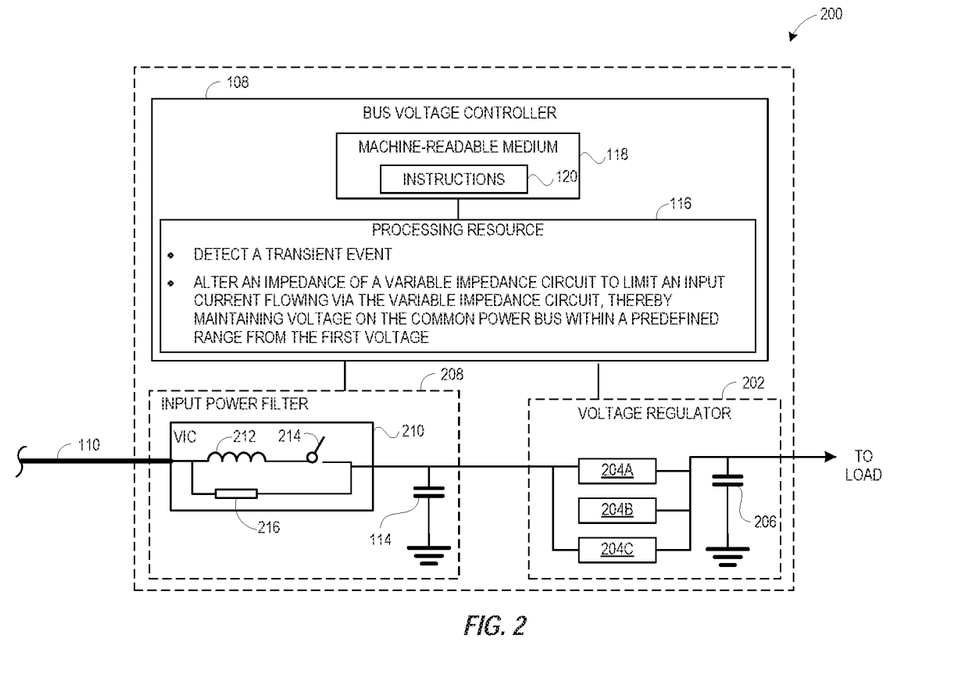
FIG. 2 depicts a power management system, in accordance with another example.
Figure 3:
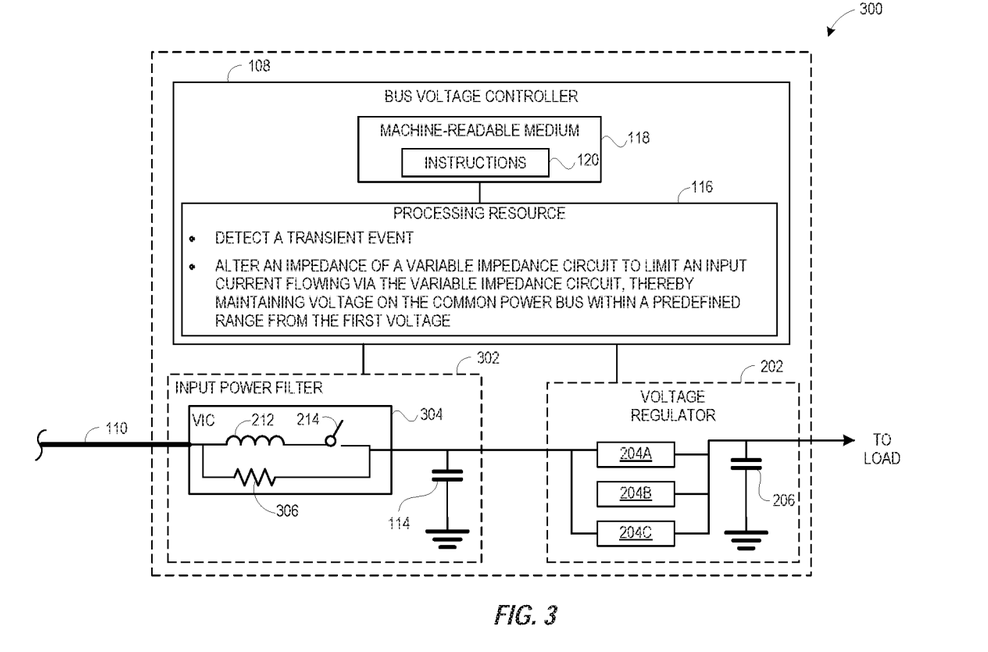
FIG. 3 depicts a power management system, in accordance with yet another example.

During operation of the system 100, in certain examples, the bus voltage may have some fluctuations or ripples. To that end, the power management system 102 may include an input power filter 106 to filter-out those fluctuations or ripples. The load 104 may be coupled to the common power bus 110 via the input power filter 106. In some examples, the input power filter 106 may be a low-pass filter that may smoothen-out the bus voltage by filtering high-frequency components and provide a filtered bus voltage at an output of the input power filter 106. In accordance with the aspects of the present disclosure, the input power filter 106 may include a variable impedance circuit (VIC) 112 coupled to an input capacitor 114. In particular, the variable impedance circuit 112 may include a first terminal and a second terminal. The first terminal of the variable impedance circuit 112 is coupled to the common power bus 110 to receive the bus voltage. Further, the input capacitor 114 is coupled to the second terminal of the variable impedance circuit 112. In some examples, another terminal of the input capacitor 114 may be grounded (e.g., connected to a ground terminal). The filtered bus voltage may be available across the input capacitor 114.

In some examples, the variable impedance circuit 112 may include electronically controllable impedance element, such as, a variable resistor, a variable inductor, a variable capacitor, or combinations thereof. In certain examples, the variable impedance circuit 112 may include a fixed value resistor, a fixed value inductor, a fixed value capacitor, an electronic switch, or combinations thereof (see FIGS. 2 and 3). An impedance of the variable impedance circuit 112 may be increased or decreased based on a control signal or command received from a bus voltage controller 108. Accordingly, current flowing via the variable impedance circuit 112 (hereinafter referred to as an input current) may also be varied.

The bus voltage controller 108 may be electrically coupled to one or more of the common power bus 110, the input power filter 106, and the load 104. In some examples, the bus voltage controller 108 may include a processing resource 116 and a machine-readable medium 118. The machine-readable medium 118 may be any electronic, magnetic, optical, or other physical storage device that may store data and/or executable instructions 120. For example, the machine-readable medium 118 may be a Random Access Memory (RAM), an Electrically Erasable Programmable Read-Only Memory (EEPROM), a storage drive, a flash memory, a Compact Disc Read Only Memory (CD-ROM), and the like. The machine-readable medium 118 may be non-transitory. As described in detail herein, the machine-readable medium 118 may be encoded with the executable instructions 120 to perform one or more methods, for example, methods described in FIGS. 5, 6, and 7.

Further, the processing resource 116 may be a physical device, for example, one or more central processing unit (CPU), one or more semiconductor-based microprocessors, an application-specific integrated circuit (ASIC), a field programmable gate array (FPGA), other hardware devices capable of retrieving and executing instructions 120 stored in the machine-readable medium 118, or combinations thereof. The processing resource 116 may fetch, decode, and execute the instructions 120 stored in the machine-readable medium 118 to control the bus voltage. As an alternative or in addition to executing the instructions 120, the processing resource 116 may include at least one integrated circuit (IC), control logic, electronic circuits, or combinations thereof that include a number of electronic components for performing the functionalities intended to be performed by the bus voltage controller 108 (described further below).

During operation of the system 100, variations in the computing demand on the system 100 may cause changes in a processing load on the processing resources (e.g., the load 104). For example, a sudden increase in the computing demand may cause an increase, e.g., a surge, in the processing load of the processing resources to fulfill the increased computing demand. Consequently, the load 104 may draw more current (hereinafter referred to as a load current), sometimes in a very short duration, to operate at high-performance levels to handle the increased processing load. Such situation in which there is a surge in the load current is hereinafter referred to as a transient event. In accordance with aspects of the present disclosure, the bus voltage controller 108 may aid in preventing excessive drop in the bus voltage during the transient event. In particular, the bus voltage controller 108 may maintain the bus voltage within a predefined range from the first voltage (e.g., the nominal bus voltage) so that operation of other loads coupled to the common power bus 110 may not be affected. In some examples, the predefined range may be defined such that the bus voltage if maintained within the predefined range, performance of loads (other than the load 104) connected to the common power bus 110 may not be affected. By way of example, the predefined range may be up-to ±10% from the first voltage level. As will be appreciated, in some examples, the predefined range may be customizable to any appropriate value by an administrator user of the system 100.

The processing resource 116 may execute one or more of the instructions 120 to detect the transient event. In some examples, the power management system 102 may include several sensors (e.g., the voltage and current sensors) disposed at various locations such as the common power bus 110, the input power filter 106, the load 104, or at any other locations on electrical connection between these components. The sensors may be connected to the bus voltage controller 108. Further, the sensors may provide signals that are representative of operating parameters (e.g., currents and/or voltages) at the respective locations of the sensors to the bus voltage controller 108. By way of example, the operating parameters may include, but are not limited to, a voltage across the input capacitor 114 (e.g., the filtered bus voltage), or the load current drawn by the load 104. Further, in some examples, the load 104 may also send an event signal indicative of the load 104 drawing excessive current (e.g., the load current) to the bus voltage controller 108. Accordingly, in certain examples, the event signal may also be an example operating parameter. The processing resource 116 may detect the transient event based on one or more of the operating parameters mentioned hereinabove. Additional details of detecting the transient event based on one or more of the operating parameters will be described in conjunction with FIGS. 5 and 6.

Further, upon detection of the transient event, the processing resource 116 may execute one or more of the instructions 120 to alter an impedance of the variable impedance circuit 112 to limit the current flowing via the variable impedance circuit 112, thereby maintaining voltage on the common power bus 110 within the predefined range from the first voltage level. In one example, upon detection of the transient event, the bus voltage controller 108 may activate a control signal for the variable impedance circuit 112. Based on the activation of the control signal, the impedance of the variable impedance circuit 112 may be changed. In particular, upon activation of the control signal, the impedance of the variable impedance circuit 112 may be increased. As the impedance of the variable impedance circuit 112 is increased, the variable impedance circuit 112 may restrict a flow of the input current there through. Advantageously, the drop in the bus voltage may be minimized such that the bus voltage may be maintained within the predefined range from the first voltage level. As the bus voltage may be maintained within the predefined range from the first voltage level, performance of other loads connected to the common power bus 110 may not be affected.

Moreover, in some examples, once the transient event is ended, the bus voltage controller 108 may again alter the impedance of the variable impedance circuit 112. For instance, once the transient event is ended, the bus voltage controller 108 may deactivate the control signal to the variable impedance circuit 112 to change the impedance of the variable impedance circuit 112 to an original value that was exerted by the variable impedance circuit 112 prior to detection of the transient event.

Referring now to FIG. 2, a power management system 200 is depicted, in accordance with an example. The power management system 200 of FIG. 2 may be representative of one example of the power management system 102 of FIG. 1 and is similar in many aspects with the power management system 102. Further, the power management system 200 may include several components that are similar to corresponding components of the power management system 102, description of which is not repeated herein.

In some examples, a load (e.g., the load 104) may operate at a voltage lower than the first voltage level. Accordingly, the load 104 should receive a reduced voltage level suitable for the load 104. Therefore, in some examples, the power management system 200 of FIG. 2 may additionally include a voltage regulator 202. The voltage regulator 202 may convert the filtered voltage to a different voltage level that is lower than the first voltage level. The power management system 200 may supply a regulated voltage at the reduced voltage level suitable for the load 104 to operate and keep the reduced voltage in regulation. In some examples, the voltage regulator 202 may be coupled between the load 104 (not shown in FIG. 2) and an input power filter 208. In particular, the voltage regulator 202 may be connected to the input capacitor 114 of the input power filter 208.

In order to achieve such voltage regulation, the voltage regulator 202 may include one or more phase converters 204A, 204B, and 204C (hereinafter collectively referred to as phase converters 204A-204C). Although the voltage regulator 202 is shown to include three phase converters, use of a voltage regulator having less than three or more than three phase converters is also envisioned within the purview of the present disclosure. In some examples, each of the phase converters 204A-204O may be a buck converter. In some other examples, the each of the phase converters 204A-204O may include a boost converter or a buck-boost converter. In certain other examples, the phase converters 204A-204C may include any combination of the buck converter, the boost converter, or the buck-boost converter. The phase converters 204A-204O may include a plurality of electronic switches (e.g., semiconductor switches, not shown), switching of which may be controlled by a voltage regulator controller (not shown) to cause the phase converters 204A-204C to convert the filtered bus voltage into a power suitable for use by the load 104. In certain examples, switching of electronic switches in the phase converters 204A-204C may be controlled by the bus voltage controller 108.

Further, the voltage regulator 202 may include an output capacitor 206 coupled in parallel with the one or more phase converters 204A-204O. The load (e.g., the load 104 not shown in FIG. 2) may be connected to the output capacitor 206. In an event of the surge in the load current, the VR controller may control switching of the electronic switches in the power converters 204A-204C to supply the increased load current. While the phase converters 204A-204O and the VR controller may take some time to adapt to the change (e.g., sudden increase) in the load current, the output capacitor 206 may cater to this increased current demand by quickly discharging an energy stored in the output capacitor 206.

The input power filter 208 may include a variable impedance circuit 210 coupled to the input capacitor 114. The variable impedance circuit 210 may be representative of one example of the variable impedance circuit 112 of FIG. 1. The variable impedance circuit 210 may include an inductor 212, an electronic switch 214, and an impedance element 216. The electronic switch 214 may be coupled in series with the inductor 212. Further, the impedance element 216 may be coupled in parallel with a series combination of the inductor 212 and the electronic switch 214. In some examples, the impedance element 216 may include a resistor (see FIG. 3), an inductor, a capacitor, or any circuit combination thereof. Further, examples of the electronic switch 214 may include, but are not limited to, a metal-oxide-semiconductor field-effect transistor (MOSFET), a field-effect transistor (FET), a bipolar junction transistor (BJT), an insulated-gate bipolar transistor (IGBT). In some examples, the electronic switch 214 may include more than one MOSFET, BJT, IGBT, or any circuit combinations thereof. In one example, the electronic switch 214 may be a back-to-back MOSFET switch.

In some examples, the inductor 212 and the impedance element 216 may be selected such that an impedance of the impedance element 216 is higher than an impedance of the inductor 212. For instance, the impedance of the impedance element 216 may be significantly higher, for example, ten times or more, than the impedance of the inductor 212. Moreover, the electronic switch 214 may be connected to the bus voltage controller 108 and is operated under the control of the bus voltage controller 108. For example, the bus voltage controller 108 may control an operating state of the electronic switch 214 by activating a control signal that is received by the electronic switch 214. The electronic switch 214 may be operated in an OFF state (as depicted in FIG. 2) or an ON state. The electronic switch 214 may block a flow of current there through when operated in the OFF state. However, when operated in the ON state, the electronic switch 214 may allow a flow of current there through.

The bus voltage controller 108 may operate the electronic switch 214 in the OFF state by deactivating the control signal to the electronic switch 214 upon determining that the bus voltage is within the predefined range from the first voltage to allow current to flow through the inductor 212. The bus voltage controller 108 may operate the electronic switch 214 in the ON state when there exists no transient condition. The control signal, when activated (i.e., attains an active state), may cause the electronic switch 214 to operate in the ON state. However, the control signal, when deactivated (i.e., attains an inactive state), may cause the electronic switch 214 to operate in the ON state. As will be understood, a level of voltage (e.g., in case of voltage controlled electronic switch) or current (e.g., in case of voltage controlled electronic switch) for the active state or the inactive state may depend of a type of the electronic switch 214 (e.g., P-channel MOSFET vs. N-channel MOSFET).

During operation, in the example implementation of FIG. 2, the bus voltage controller 108 may detect the transient event based on monitoring of one or more operating parameters including, but not limited to, the voltage across the input capacitor 114 (i.e., the filtered bus voltage), the load current, the event signal from the load 104, the current flowing through the one or more phase converters 204A-204O (hereinafter also referred to as a phase current), or the voltage across the output capacitor 206 (hereinafter also referred to as an output voltage), or combinations thereof. Additional details regarding detecting the transient event based on one or more of the operating parameters will be described in conjunction with FIG. 5.

Upon detection of the transient event, the bus voltage controller 108 may operate the electronic switch 214 in an OFF state. The electronic switch 214, when operated in the OFF state, may allow current to flow through the impedance element 216. As previously noted, the impedance of the impedance element 216 is higher (in some examples, significantly higher, for example, by about 10 times or more) than the impedance of the inductor 212. Therefore, a magnitude of the current than can flow through the variable impedance circuit 210, when the electronic switch 214 is operating in the OFF state, is lower in comparison to the current that was flowing through the variable impedance circuit 210 with the electronic switch 214 operating in the ON state. Accordingly, a current drawn from the common power bus 110 may be limited to the current that can flow through the impedance element 216, as the electronic switch 214 is operating in the OFF state. Advantageously, the drop in the bus voltage may be minimized such that the bus voltage may be maintained within the predefined range from the first voltage level. As the bus voltage may be maintained within the predefined range from the first voltage level, performance of other loads connected to the common power bus 110 may not be affected.

FIG. 3 depicts a power management system 300, in accordance with yet another example. The power management system 300 of FIG. 3 may be representative of one example of the power management system 200 of FIG. 2 and is similar in many aspects with the power management system 200. Further, the power management system 300 may include several components that are similar to corresponding components of the power management system 102, description of which is not repeated herein. In comparison to the power management system 200 of FIG. 1, the power management system 300 of FIG. 3 may include the input power filter 302 having a variable impedance circuit 304 that is representative of an example of the variable impedance circuit 210 of FIG. 2. The variable impedance circuit 304 may include a resistor 306 as an impedance element, which is connected in a similar fashion as described in FIG. 2. More particularly, the resistor 306 is connected in parallel with the series combination of the inductor 212 and the electronic switch 214. In some examples, the inductor 212 and the resistor 306 may selected such that an impedance (i.e., resistance) of the resistor 306 is higher than an impedance of the inductor 212. For instance, the impedance of the resistor 306 may be significantly higher, for example, ten times or more, than the impedance of the inductor 212. Operational details of the bus voltage controller 108 and the electronic switch 214 may remain same as that of the power management system 200.

Figure 4:
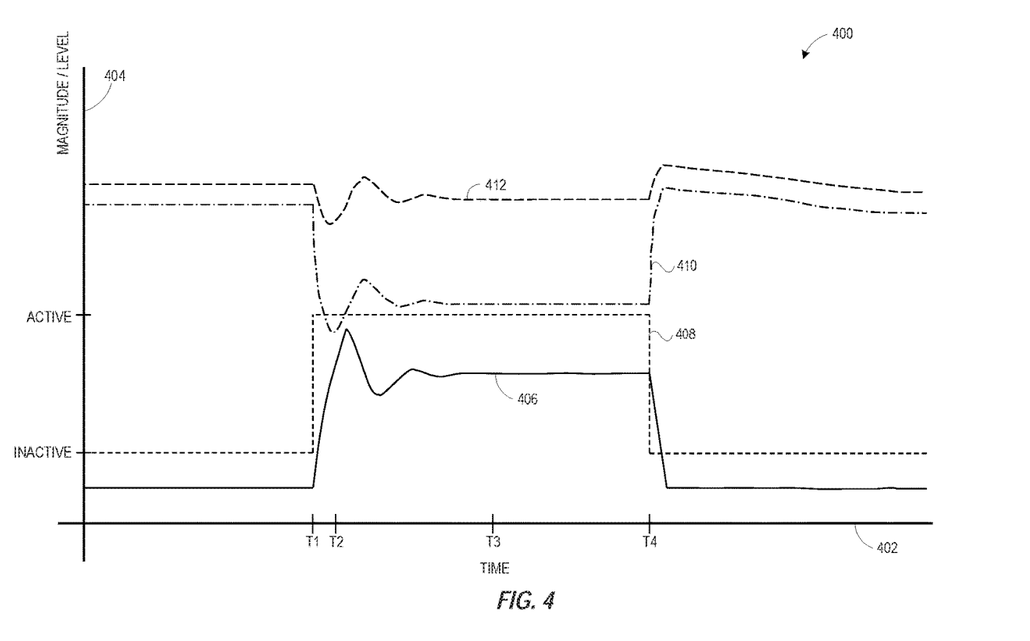
FIG. 4 depicts a graphical representation showing various signals in the power management system of FIG. 1, in accordance with an example.

In FIG. 4, a graphical representation 400 showing various signals measured in a power management system (e.g., the power management system 300) is depicted, in accordance with an example. For illustration purpose, the graphical representation 400 is described with reference to the power management system 300 of FIG. 3. As will be appreciated, the illustration of FIG. 4 may also be applicable to the power management systems 102 of FIG. 1 and the power management system 200 of FIG. 2 as well, without limiting the scope of the present disclosure. In the graphical representation 400, an X-axis 402 may represent time and a Y-axis 404 may represent magnitude or level of various signals. For example, a signal represented by a solid line is the load current (e.g., current drawn by the load 104), hereinafter referred to as a load current 406. Furthermore, a signal represented by a short-dashed line is a control signal 408 generated by the bus voltage controller 108 which is sent to the variable impedance circuit 304 (112, or 304). Moreover, a signal represented by a line with a dash-dot pattern is a filtered bus voltage 410 that is measured across the input capacitor 114. Additionally, a signal represented by a long-dashed line is a bus voltage 412 on the input power bus 110.

As depicted in the graphical representation 400, the load current 406 starts increasing at time T1. Such surge in the load current 406 may be detected by the bus voltage controller 108 as a transient event and the control signal 408 may be activated by the bus voltage controller 108. Further, as can be observed in the graphical representation 400, prior to the detection of the transient event (i.e., prior to time T1), the filtered bus voltage 410 follows the bus voltage 412 with constant or nearly constant voltage difference. In particular, the bus voltage 412 may be maintained at the first voltage level before time T1. However, when the load current 406 surges, both the bus voltage 412 and the filtered bus voltage 410 starts to drop.

In accordance with the aspects of the present disclosure, upon detection of the transient event, the bus voltage controller 108 activates the control signal 408. For example, a level of the control signal 408 changes at time T1 from a low level (i.e., inactive state) to a high level (active state). As previously noted, in response to the activation of the control signal 408, the variable impedance circuit 112 increases its impedance and restricts flow of the current there through. Consequently, both the bus voltage 412 and the filtered bus voltage 410 starts to rise at time T2 and may attain a steady state level at time T3. In one example, the steady state level may be within the predefined range from the first voltage level. Further, at time T4, the load current 406 may starts to drop and such drop in the load current 406 is detected by the bus voltage controller 108. Accordingly, the bus voltage controller 108 may deactivate the control signal 408. In response to the deactivation of the control signal 408, the impedance of the variable impedance circuit 112 may be decreased and the bus voltage 412 may gradually return to the first voltage level.

Figure 5:
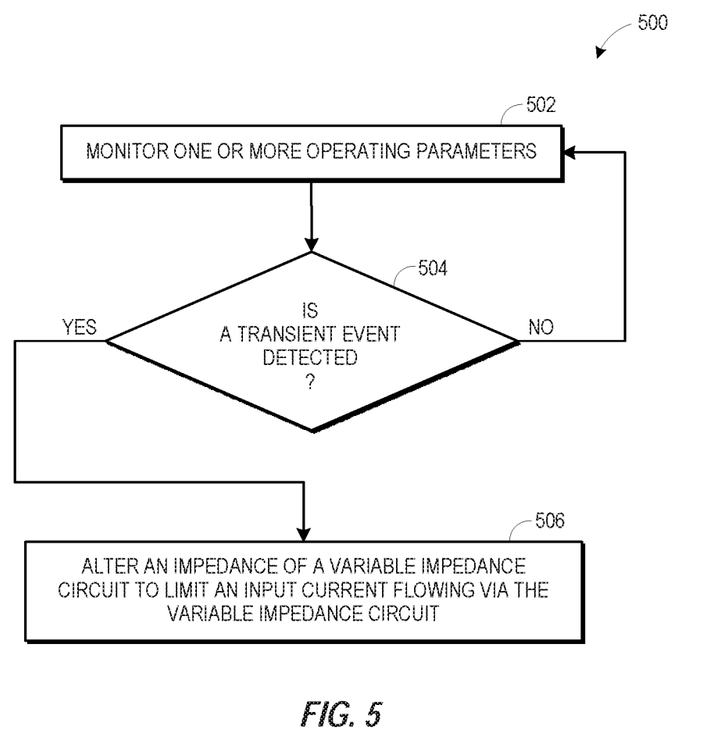
FIG. 5 is a flow diagram depicting a method for controlling voltage on a common power bus, in accordance with an example.

Referring now to FIG. 5, a flow diagram depicting a method 500 for controlling the voltage on the common power bus 110 (e.g., the bus voltage) is presented, in accordance with an example. In some examples, the method 500 may be performed by the bus voltage controller 108. For illustration purposes, the method 500 will be described in conjunction with the power management system 102 of FIG. 1. As will be appreciated the method 500 may also be applicable to the power management system 200 of FIG. 2 and the power management system 300 of FIG. 3, without limiting the scope of the present disclosure. The method 500 may include method blocks 502, 504, and 506 that may be performed by a processor-based system, for example, the bus voltage controller 108. In particular, operations at the method blocks 502, 504, and 506 may be performed by the processing resource 116 by executing the instructions 120 stored in the machine-readable medium 118.

At block 502, the bus voltage controller 108 may monitor one or more operating parameters. Signals corresponding to one or more of these operating parameters may be received by the bus voltage controller 108 from respective sensors (e.g., voltage and/or current sensors, not shown). Further, at block 504, the bus voltage controller 108 may perform a check to detect the transient event that has caused a surge in the load current. In some examples, the bus voltage controller 108 may determine whether there exists the transient event based on the operating parameters monitored at the block 502. For example, at block 504, the bus voltage controller 108 may compare one or more of the voltage across the input capacitor 114, the load current drawn by the load 104, one or more phase currents, or the output voltage with respective threshold values to determine whether there exists the transient event.

In some examples, the bus voltage controller 108 may determine that the transient event has occurred if the voltage across the input capacitor 114 drops below a first threshold value. In another example, the bus voltage controller 108 may determine that the transient event has occurred if the output voltage drops below a second threshold value. In yet another example, the bus voltage controller 108 may determine that the transient event has occurred if any of the phase currents exceeds a third threshold value. Moreover, in yet another example, the bus voltage controller 108 may determine that the transient event has occurred if the load current exceeds a fourth threshold value. The first threshold value and the second threshold value may be values representing voltage levels; and the third threshold value and the fourth threshold value may be values representing current levels. In some examples, the first, second, third, and fourth threshold values may be predefined in the bus voltage controller 108 and are stored in the machine-readable memory 118. In certain examples, the first, second, third, and fourth threshold values may be customizable by the administrator user of a system (e.g., the system 100). In certain other examples, the load 104 may send the event signal indicative of the load 104 drawing excessive current to the bus voltage controller 108. Accordingly, the bus voltage controller 108 may determine that the transient event has occurred if the event signal is received from the load 104, in some examples.

At block 504, if the transient event is not detected, the bus voltage controller 108 may continue to monitor the operating parameters at block 502 and perform the check at block 504 again. However, at block 504, if the transient event is detected, at block 506, the bus voltage controller 108 may alter the impedance of the variable impedance circuit 112 to limit an input current flowing via the variable impedance circuit 210, thereby maintaining bus voltage within the predefined range from the first voltage level. For example, the bus voltage controller 108 may control the variable impedance circuit 112 to increase the impedance thereof by activating the control signal to the variable impedance circuit 112. Responsive to an active control signal, the impedance of the variable impedance circuit 112 may be changed from a first value to a second value that is higher than the first value. As the impedance of the variable impedance circuit 210 is increased, the variable impedance circuit 112 may restrict the flow of the current there through. Consequently, the supply of the load current may be restricted. Advantageously, the drop in the bus voltage may be minimized such that the bus voltage may be maintained within the predefined range from the first voltage level.

Figure 6:
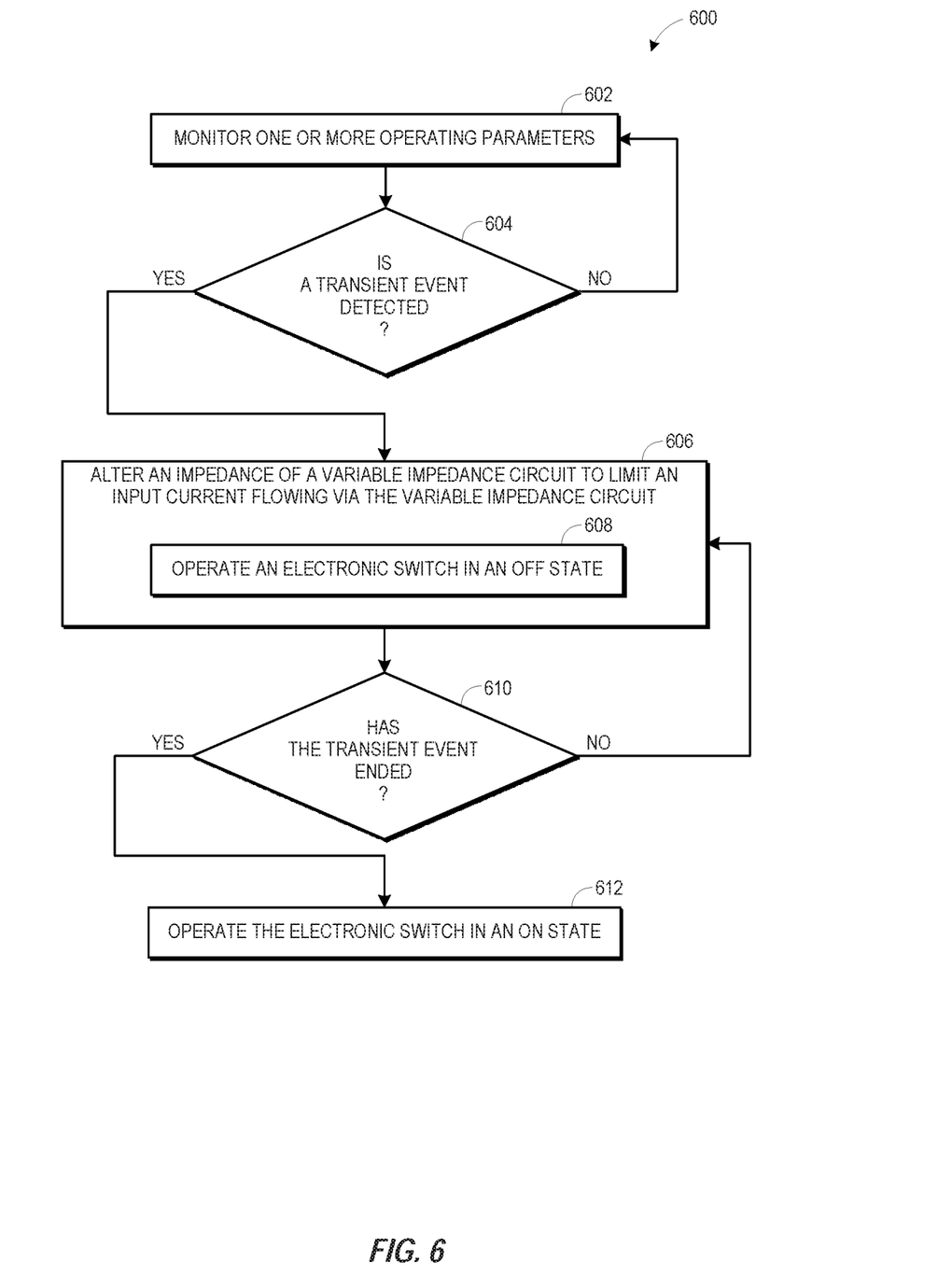
FIG. 6 is a flow diagram depicting a method for controlling voltage on a common power bus, in accordance with another example.

FIG. 6 is a flow diagram depicting a method 600 for controlling the bus voltage, in accordance with another example. In some examples, the method 600 may be performed by the bus voltage controller 108. For illustration purposes, the method 600 will be described in conjunction with the power management system 200 of FIG. 2. As will be appreciated the method 600 may also be applicable to the power management system 102 of FIG. 1 and the power management system 300 of FIG. 3, without limiting the scope of the present disclosure. The method 600 may include method blocks 602, 604, 606, 608, 610, and 612 (hereinafter collectively referred to as blocks 602-612) that may be performed by a processor-based system, for example, the bus voltage controller 108. In particular, operations at the method blocks 602-612 may be performed by the processing resource 116 by executing the instructions 120 stored in the machine-readable medium 118.

At block 602, the bus voltage controller 108 may monitor one or more operating parameters including, but not limited to, one or more of the filtered bus voltage, the load current, the event signal from the load 104, one or more phase current(s), or the output voltage. Further, at block 604, the bus voltage controller 108 may perform a check to detect a transient event that has caused a surge in the load current. In some examples, the bus voltage controller 108 may determine whether there exists the transient event based on the operating parameters monitored at the block 602 in a similar fashion as described in block 504 of FIG. 5. At block 604, if the transient event is not detected, the bus voltage controller 108 may continue to monitor the operating parameters at block 602 and perform the check at block 604 again. However, at block 604, if the transient event is detected, at block 606, the bus voltage controller 108 may alter an impedance of the variable impedance circuit 210 to limit an input current flowing via the variable impedance circuit 210, thereby maintaining bus voltage within the predefined range from the first voltage level.

Prior to detection of the transient event, the bus voltage controller 108 may operate the electronic switch 214 in the ON state. The electronic switch 214, when operated in the ON state, may allow the current to flow via the inductor 212 and the electronic switch 214. Accordingly, when the electronic switch 214 is operational in the ON state (i.e., turned-on), the variable impedance circuit 210 may offer a first impedance which may be equivalent to an impedance of the inductor 212 (considering that the electronic switch 214 has no or negligible impedance).

In some examples, altering the impedance of the variable impedance circuit 210 at block 606 may include operating, at block 608, the electronic switch 214 in the OFF state by the bus voltage controller 108. The electronic switch 214, when operated in the OFF state, may block a flow of current there through. Accordingly, a current that was passing through the inductor 212 and the electronic switch 214 (when the switch was turned-on or operating in an ON state) now flows through the impedance element 216. In particular, when the electronic switch 214 is operational in the OFF state (i.e., turned-off), the variable impedance circuit 210 may offer a second impedance which may be equivalent to an impedance of the impedance element 216. As previously noted, the impedance of the impedance element 216 is higher (i.e., significantly higher, for example, by about 10 times higher) than the impedance of the inductor 212. Therefore, a magnitude of the current that can flow through the variable impedance circuit 210, when the electronic switch 214 is operating in the OFF state, is lower in comparison to the current flowing through the variable impedance circuit 210 with the electronic switch 214 operating in the ON state. Accordingly, the current drawn from the common power bus 110 may be limited to the current than can flow through the variable impedance circuit 210, when the electronic switch 214 is operating in the OFF state.

Further, in some examples, at block 610, the bus voltage controller 108 may perform another check to determine whether the transient event has been ended. The bus voltage controller 108 may monitor one or more of the operating parameters to ascertain whether the transient event has been ended. For example, at block 610, the bus voltage controller 108 may compare one or more of the filtered bus voltage, the load current, one or more phase currents, the output voltage, or the bus voltage with respective threshold values to determine whether the transient event has been ended. For example, the bus voltage controller 108 may determine that the transient event has been ended if the bus voltage is at the first voltage level. In another example, the bus voltage controller 108 may determine that the transient event has been ended if the filtered bus voltage is more than a fifth threshold value that is lower than or equal to the first voltage level. In another example, the bus voltage controller 108 may determine that the transient event has been ended if the output voltage is more than a sixth threshold value. In yet another example, the bus voltage controller 108 may determine that the transient event has been ended if the phase currents reduce below a seventh threshold value. Moreover, in yet another example, the bus voltage controller 108 may determine that the transient event has been ended if the load current drops below an eighth threshold value. In some examples, the bus voltage controller 108 may determine that the transient event has been ended if an event end signal is received from the load 104. The event end signal may be generated by the load 104 (e.g., the processing resource) when load current returns to a normal value.

The fifth threshold value and the sixth threshold value may be values representing voltage levels; and the seventh threshold value and the eighth threshold value may be values representing current levels. In some examples, the fifth, sixth, seventh, and eighth threshold values may be predefined in the bus voltage controller 108 and are stored in the machine-readable memory 118. In certain examples, the fifth, sixth, seventh, and eighth threshold values may be customizable by the administrator user of a system (e.g., the system 100).

At block 610, if it is determined that the transient event has not been ended; the bus voltage controller 108 may again perform the check at block 610 while continuing to operate the electronic switch in the OFF state. However, if it is determined that the transient event has been ended; the bus voltage controller 108, at block 612, may operate the electronic switch 214 in the ON state (e.g., turn-on the electronic switch 214). Accordingly, the impedance of the variable impedance circuit 210 may return to the first impedance and a normal operation of the variable impedance circuit 210 may be resumed.

Figure 7:
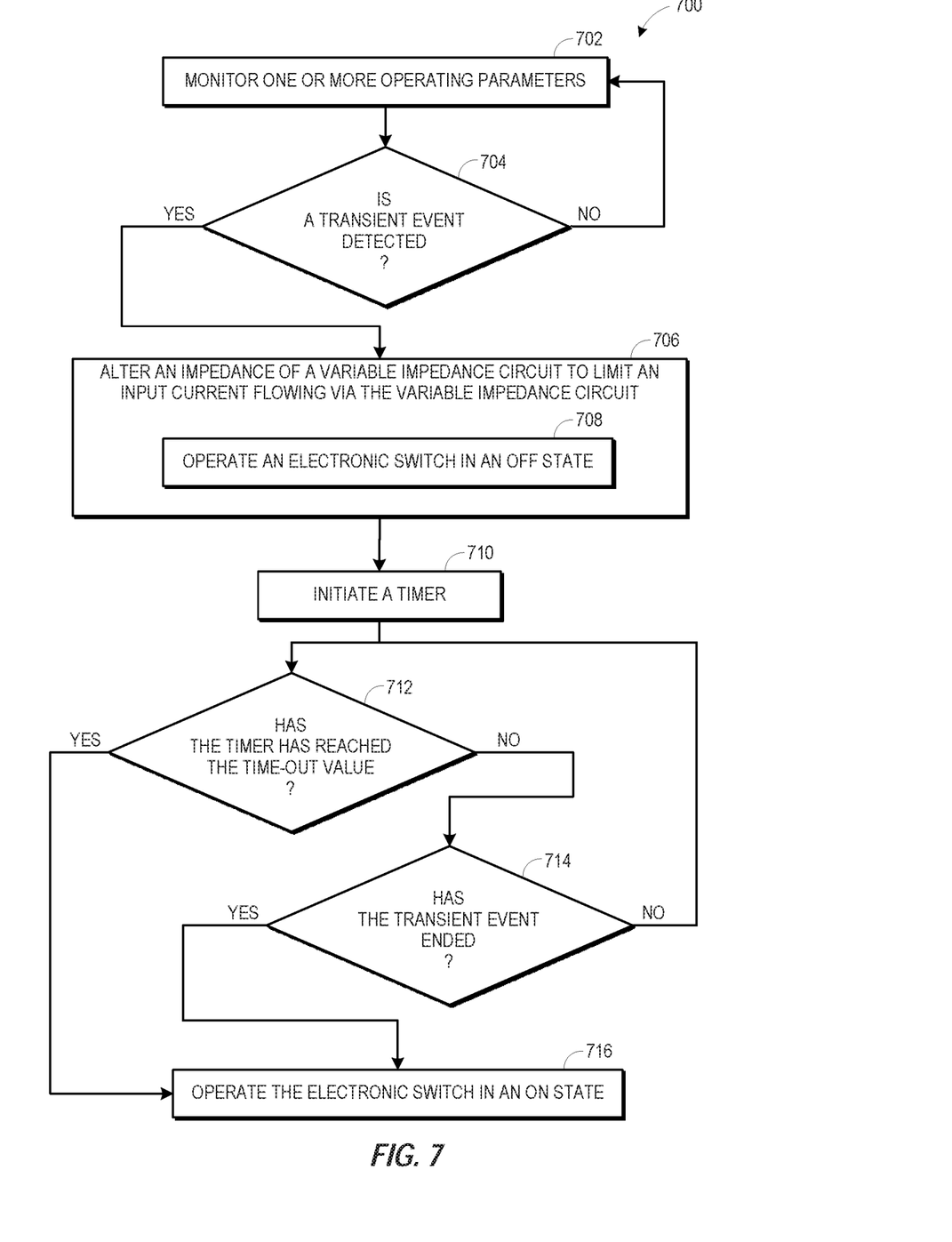
FIG. 7 is a flow diagram depicting a method for controlling voltage on a common power bus, in accordance with yet another example.

FIG. 7 is a flow diagram depicting a method 700 for controlling voltage on a common power bus (e.g., the common power bus 110), in accordance with another example. In some examples, the method 700 may be similar in many aspects with the method 600 of FIG. 6 and is performed by the bus voltage controller 108. In comparison to the method 600, in the method 700 of FIG. 7, the bus voltage controller 108 may implement an additional measure of time in operating the electronic switch 214. The method 700 may include method blocks 702, 704, 706, 708, 710, 712, 714, and 716 (hereinafter collectively referred to as blocks 702-716) may be performed by the processing resource 116 by executing the instructions 120 stored in the machine-readable medium 118. Blocks 702, 704, 706, 708, 714, and 716 of method 700 are similar to blocks 602, 604, 606, 608, 610, and 612, respectively, of the method 600 of FIG. 6, description of these blocks is not repeated.

In some examples, in executing the block 706, at block 710, the bus voltage controller 108 may initiate a timer upon turning-on the electronic switch 214 (at block 708). The timer may have a predetermine time as a time-out value. The time-out value may be a duration for which the transient event may last or a time the power supply (not shown) may take to recover the common power bus 110. In some examples, the time-out value may be set by the administrator user. In some examples, the time-out value may be determined by the bus voltage controller 108 based on data regarding durations of previous transient events. In some examples, the bus voltage controller 108 may set the time-out value to an average duration corresponding to all previous transient events. In certain other examples, the bus voltage controller 108 may set the time-out value to an average duration corresponding to a predefined number of consecutive previous transient events (e.g., average time duration of previous five transient events). Further, in some examples, the time-out value may be determined by the bus voltage controller 108 as the time that the power supply may take to recover the common power bus 110. Moreover, at block 712, the bus voltage controller 108 may perform a check to determine whether the timer has reached the time-out value. At block 712, if it is determined that the timer has reached the time-out value (i.e., the timer has timed-out), the bus voltage controller 108 may perform a method at block 716 (described later). However, at block 712, if it is determined that the timer has not yet reached the time-out value (i.e., the timer is not timed-out yet), the bus voltage controller 108, at block 714, may perform another check to determine whether the transient event has been ended in a similar as described in block 610 of FIG. 6.

At block 714, if it is determined that the transient event has not been ended; the bus voltage controller 108 may again perform the check at block 712 while continuing to operate the electronic switch 214 in the OFF state. However, if it is determined that the transient event has been ended; the bus voltage controller 108, at block 716, may operate the electronic switch 214 in the ON state (e.g., turn-on the electronic switch 214). Accordingly, the impedance of the variable impedance circuit 210 may return to the first impedance and a normal operation of the variable impedance circuit 210 may be resumed.

Figure 8:
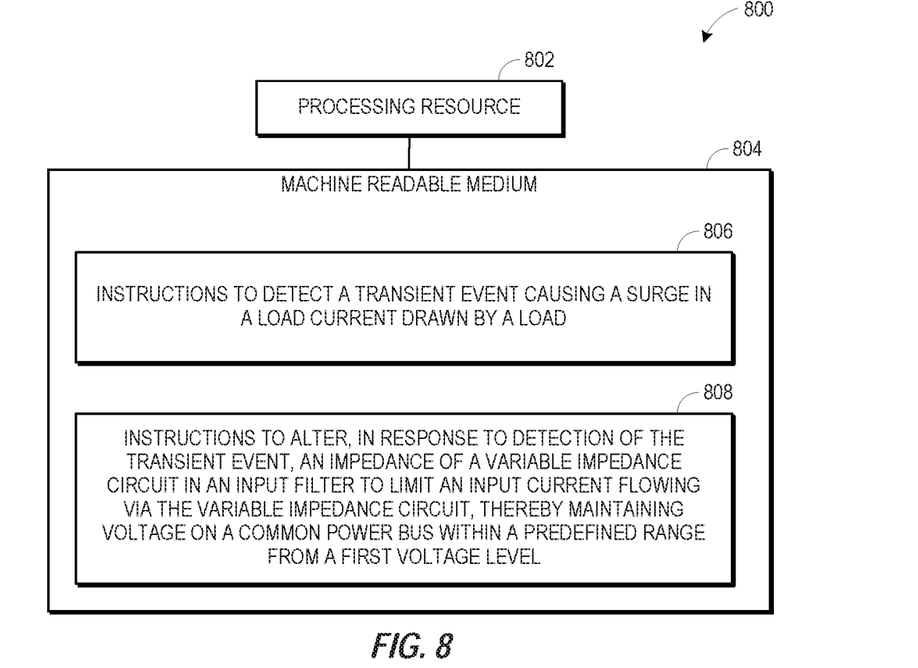
FIG. 8 is a block diagram depicting a processing resource and a machine-readable medium encoded with example instructions to control voltage on a common power bus, in accordance with an example.

FIG. 8 is a block diagram 800 depicting a processing resource 802 and a machine-readable medium 804 encoded with example instructions to the control the bus voltage, in accordance with an example. The block diagram 800 may be representative of one example of the bus voltage controller 108. The machine-readable medium 804 may be non-transitory and is alternatively referred to as a non-transitory machine-readable medium 804. In some examples, the machine-readable medium 804 may be accessed by the processing resource 802. In some examples, the processing resource 802 may represent one example of the processing resource 116 of the bus voltage controller 108. Further, the machine-readable medium 804 may represent one example of the machine-readable medium 118 of the bus voltage controller 108.

The machine-readable medium 804 may be any electronic, magnetic, optical, or other physical storage device that may store data and/or executable instructions. Therefore, the machine-readable medium 804 may be, for example, RAM, an EEPROM, a storage drive, a flash memory, a CD-ROM, and the like. As described in detail herein, the machine-readable medium 804 may be encoded with executable instructions 806 and 808 for performing the method 500 described in FIG. 5. Although not shown, in some examples, the machine-readable medium 804 may be encoded with certain additional executable instructions to perform the method 600 of FIG. 6, the 700 of FIG. 7, and/or any other operations performed by the bus voltage controller 108, without limiting the scope of the present disclosure.

The processing resource 802 may be a physical device, for example, one or more CPU, one or more semiconductor-based microprocessor, one or more GPU, ASIC, FPGA, other hardware devices capable of retrieving and executing the instructions 806, 808 stored in the machine-readable medium 804, or combinations thereof. In some examples, the processing resource 802 may fetch, decode, and execute the instructions 806, 808 stored in the machine-readable medium 804 to determine whether to control the bus voltage. In certain examples, as an alternative or in addition to retrieving and executing the instructions 806, 808, the processing resource 802 may include at least one IC, other control logic, other electronic circuits, or combinations thereof that include a number of electronic components for performing the functionalities intended to be performed by the bus voltage controller 108 of FIG. 1.

The instructions 806 when executed by the processing resource 802 may cause the processing resource 802 to detect the transient event causing the surge in the load current drawn by a load 104. Further, the instructions 808 when executed by the processing resource 802 may cause the processing resource 802 to alter, in response to detection of the transient event, an impedance of the variable impedance circuit 112, 210, or 304 to limit an input current flowing via the variable impedance circuit 112, 210, or 304, thereby maintaining voltage on the common power bus 110 within the predefined range from the first voltage level.

Although not shown in FIG. 8, in some examples, the machine-readable medium 804 may include instructions which when executed by the processing resource 802 may cause the processing resource 802 to operate the electronic switch 214 in an ON state upon determining that there exists no transient event (i.e., when the bus voltage is within a predefined range from the first voltage). In some examples, the machine-readable medium 804 may include instructions which when executed by the processing resource 802 may cause the processing resource 802 to operate the electronic switch 214 in the OFF state upon detection of the transient event. As previously noted, when the electronic switch 214 operates in the OFF state, an impedance of the variable impedance circuit 112, 210, 302 increases that may cause reduction in the input current drawn by the variable impedance circuit 112, 210, 302. Advantageously, the drop in the bus voltage may be minimized and operation of other loads connected to the common power bus 110 may not be affected. Moreover, in certain examples, the machine-readable medium 804 may also include instructions which when executed by the processing resource 802 may cause the processing resource 802 to transition the electronic switch 214 to the ON state from the OFF state after an elapse of a predetermined time (e.g., the time-out value) from a time of the detection of the transient event.

While certain implementations have been shown and described above, various changes in form and details may be made. For example, some features and/or functions that have been described in relation to one implementation and/or process may be related to other implementations. In other words, processes, features, components, and/or properties described in relation to one implementation may be useful in other implementations. Furthermore, it should be appreciated that the systems and methods described herein may include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A power management system, comprising:
an input power filter coupled between a common power bus and a load, wherein the common power bus comprises a voltage at a first voltage level, wherein the input power filter comprises:
a variable impedance circuit coupled to the common power bus; and
an input capacitor coupled to the variable impedance circuit
a bus voltage controller coupled to the input power filter to detect a transient event causing a surge in a load current drawn by the load and to alter, in response to detection of the transient event, an impedance of the variable impedance circuit to limit an input current flowing via the variable impedance circuit, thereby maintaining the voltage on the common power bus within a predefined range from the first voltage level; and
a voltage regulator coupled in series between the input power filter and the load, wherein the voltage regulator comprises:
one or more phase converters; and
an output capacitor coupled in parallel with the one or more phase converters.

2. The power management system of claim 1, wherein the bus voltage controller is to detect the transient event based on a voltage across the input capacitor, the load current drawn by the load, an event signal generated by the load, or combinations thereof.

3. The power management system of claim 1, wherein the variable impedance circuit comprises:
an inductor;
an electronic switch coupled in series with the inductor; and
an impedance element coupled in parallel with a series combination of the inductor and the electronic switch.

4. The power management system of claim 3, wherein the bus voltage controller is to operate the electronic switch in an ON state upon determining that the voltage on the common power bus is within a predefined range from the first voltage to allow current to flow through the inductor.

5. The power management system of claim 3, wherein the bus voltage controller is to operate the electronic switch in an OFF state upon detection of the transient event, wherein the electronic switch, when operated in the OFF state, allows current to flow through the impedance element.

6. The power management system of claim 3, wherein the bus voltage controller is to transition the electronic switch to an ON state from an OFF state after an elapse of a predetermined time from a time of detection of the transient event.

7. The power management system of claim 3, wherein the impedance element comprises a resistor, an inductor, a capacitor, or combinations thereof.

8. The power management system of claim 3, wherein an impedance of the impedance element is greater than an impedance of the inductor.

9. The power management system of claim 1, wherein the bus voltage controller is to detect the transient event based on one or more of current flowing through the one or more phase converters, a voltage across the output capacitor, a voltage across the input capacitor, an event signal generated by the load, or combinations thereof.

10. The power management system of claim 1, wherein the load comprises one or more processors.

11. A non-transitory machine-readable medium storing instructions executable by a processing resource, the instructions comprising:
instructions to detect a transient event causing a surge in a load current drawn by a load coupled to an input power filter receiving a voltage from a common power bus via a voltage regulator comprising one or more phase converters and an output capacitor coupled in parallel with the one or more phase converters, wherein the input power filter comprises a variable impedance circuit coupled to an input capacitor, and wherein the transient event is detected based on one or more of current flowing through the one or more phase converters, a voltage across the output capacitor, a voltage across the input capacitor, an event signal generated by the load, or combinations thereof; and instructions to alter, in response to detection of the transient event, an impedance of the variable impedance circuit to limit an input current flowing via the variable impedance circuit, thereby maintaining voltage on the common power bus within a predefined range from a first voltage level.

12. The non-transitory machine-readable medium of claim 11, wherein the variable impedance circuit comprises:
an inductor;
an electronic switch coupled in series with the inductor; and
an impedance element coupled in parallel with a series combination of the inductor and the electronic switch.

13. The non-transitory machine-readable medium of claim 12, further comprising instructions to operate the electronic switch in an ON state upon determining that the voltage on the common power bus is within a predefined range from the first voltage level.

14. The non-transitory machine-readable medium of claim 12, further comprising instructions to operate the electronic switch in an OFF state upon detection of the transient event.

15. The non-transitory machine-readable medium of claim 12, further comprising instructions to transition the electronic switch to an ON state from an OFF state after an elapse of a predetermined time from a time of detection of the transient event.

16. A method comprising:
detecting a transient event causing a surge in a load current drawn by a load coupled to an input power filter receiving a voltage from a common power bus via a voltage regulator comprising one or more phase converters and an output capacitor coupled in parallel with the one or more phase converters, wherein the input power filter comprises a variable impedance circuit coupled to an input capacitor, wherein the variable impedance circuit comprises an inductor coupled to the common power bus, an electronic switch coupled in series with the inductor, and an impedance element coupled in parallel with a series combination of the inductor and the electronic switch, wherein the transient event is detected based on one or more of current flowing through the one or more phase converters, a voltage across the output capacitor, a voltage across the input capacitor, an event signal generated by the load, or combinations thereof; and altering, in response to detection of the transient event, an impedance of the variable impedance circuit to limit an input current flowing via the variable impedance circuit, thereby maintaining voltage on the common power bus within a predefined range from a first voltage level.

17. The method of claim 16, wherein altering the impedance comprises operating the electronic switch in an ON state upon determining that the voltage on the common power bus is within a predefined range from the first voltage level.

18. The method of claim 16, wherein altering the impedance comprises operating the electronic switch in an OFF state upon detection of the transient event.

19. The method of claim 16, further comprising transitioning the electronic switch to an ON state from an OFF state after an elapse of a predetermined time from a time of detection of the transient event.

* * * * *